CHRISTOPHER JOHN LAKE (NAME CHANGED FROM JOHN CHRISTOPHER LAKE BY JUDICIAL ORDER).
MIXING AND REGULATING VALVE.
APPLICATION FILED JUNE 21, 1907.
913,516. Patented Feb. 23, 1909.
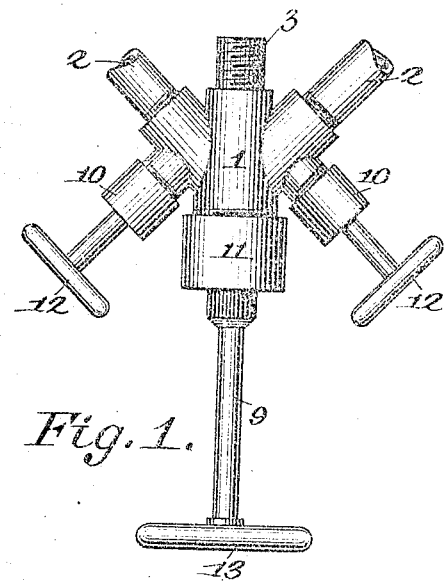
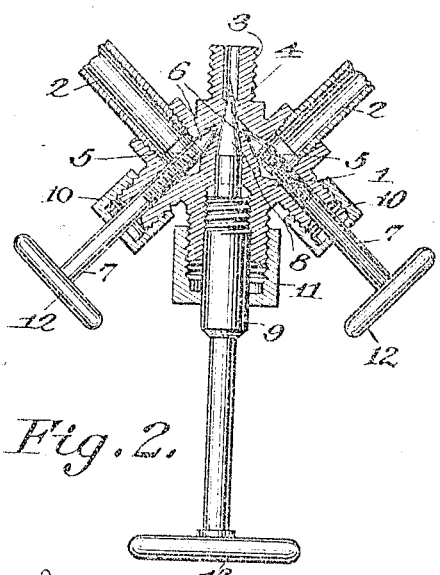
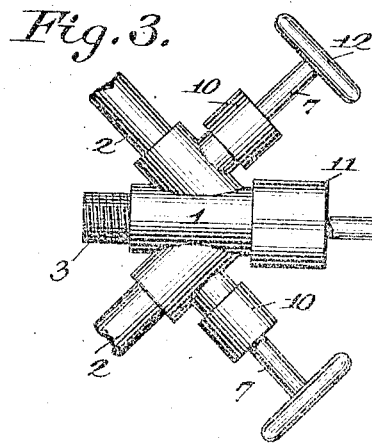
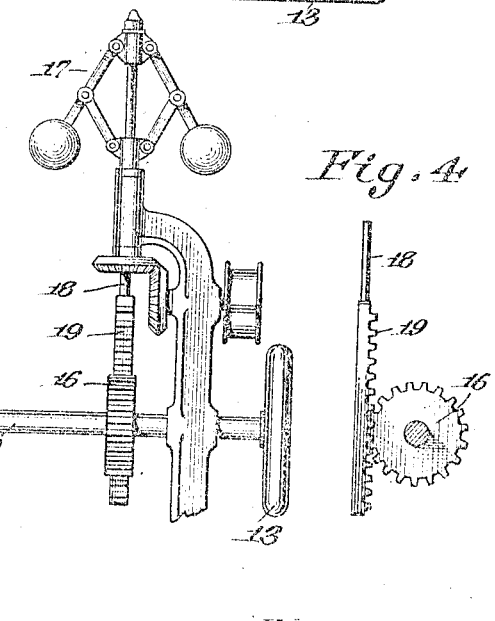
Witnesses:
E. M. Marble
N. E. Costello
Inventor,
Christopher John Lake
formerly John Christopher Lake
By Spencer Heath
Attorney.

UNITED STATES PATENT OFFICE.

CHRISTOPHER JOHN LAKE, (NAME CHANGED FROM JOHN CHRISTOPHER LAKE BY JUDICIAL ORDER,) OF BRIDGEPORT, CONNECTICUT.

MIXING AND REGULATING VALVE.

No. 913,516.

Specification of Letters Patent.

Patented Feb. 23, 1909.

Original application filed January 4, 1906, Serial No. 294,552. Divided and this application filed June 21, 1907. Serial No. 380,069.

*To all whom it may concern:*

Be it known that I, CHRISTOPHER JOHN LAKE, (formerly JOHN CHRISTOPHER LAKE,) a citizen of the United States, and a resident of Bridgeport, in the county of Fairfield and State of Connecticut, have invented certain new and useful Improvements in Mixing and Regulating Valves, of which the following is a specification.

This is the specification of a divisional application pertaining to subject matter described in my former application filed January 4, 1906, Serial Number, 294,552 and which was divided out of the claims in said former application pursuant to a requirement of division in Office letter of October 6, 1906.

The present invention consists in an improved valve or mixing device for the convenient regulation of the proportion and quantity of two or more fluids, as where it is desired to mix oil or water and air or steam to form a spray or vapor.

The object of my invention is to produce a regulating valve that will give independent control of the supply of two or more fluids entering into a single pipe or chamber; also to provide means for cutting off or controlling the combined flow without varying the proportion in which the several fluids are admitted.

While my invention is intended to be used for all purposes in which a uniform mixture of two or more fluids is desired, it is more particularly designed for use in connection with fuel mixing devices for engines in which gas or oil mixed with air or other fluids are used. A serious problem with this type of engine has been to provide for the uniform mixing of the several fuel ingredients independently of the speed of the engine and the quantity of fuel consumed. By the use of my mixing device a practically uniform mixture can be obtained for variable speeds and variable quantities of flow, since the proportions of the ingredients of the mixture to be supplied are regulated by means entirely independent of those which regulate the quantity of the mixture delivered to the engine.

With the above objects in view and further objects which will appear as the nature of my invention is more fully disclosed, I have invented a novel valve or regulator one embodiment of which, as adapted to two fluids, will be described by reference to the annexed drawing in which, Figure 1 represents an outside view of my improved valve, Fig. 2 is a sectional view showing its internal construction. Fig. 3 is a view of my mixing device in combination with a centrifugal governor for securing automatic regulation of the flow of mixed fluids. Fig. 4 is a side view of the toothed gearing shown in Fig. 3.

Similar reference characters are used to designate corresponding parts throughout the several views.

1 is the main body of the valve, having the inlet pipes 2 for admitting the fluids to be combined and the threaded outlet 3 for the combined flow; 4 is the main chamber containing the valve point 8 and the separate fluids are admitted from the inlet pipes 2 through the auxiliary chambers 5. The admission of the several fluids from the chambers 5 to the main chamber 4 is controlled by conical portion of the threaded rods or stems 7. The fluids are thus admitted in the desired proportion to the chamber 4, whence their exit together through the outlet 3 is controlled by the conical portion 8 of the threaded rod or stem 9. The passages from the chambers 5 are shown entering the chamber 4 in its conical portion near the passage to the outlet 3 so that the conical portion 8 of the stem 9 serves to close all of the passages to the chamber 4 at the same time, thereby preventing any mixing of the two fluids from the inlets 2 when the passage to the outlet 3 is closed by the point 8. The stems 7 and 9 are made fluid-tight where they enter the body 1 by means of the stuffing boxes 10 and 11 and are provided at their outer extremities with the hand wheels 12 and 13. The stem 9, however, may be rotated as shown in Fig. 3 by the pinion 16 or other suitable connection to an automatic governor.

Fig. 3 shows my mixing device as it may be combined with an automatic governor when used to regulate the fuel supply of an internal combustion engine or other like purposes. In this arrangement the stem 9 is provided with the pinion 16 which is engaged by the rack 19 attached to the stem 18 of the automatic governor 17. When a governor is thus used all the passages in the mixing device are normally open, especially when the engine is at rest and are only partly closed by the action of the governor. The hand wheel 13 is therefore retained to afford a positive means of cut-off and means may be provided if desired for disconnecting the governor when the valve is operated by means of the hand wheel.

The operation of my device is as follows: Referring to Figs. 1 and 2, when starting the mixer the stem 9 is withdrawn by turning the wheel 13 so as to open the chamber 4 to the outlet 3. The two fluids are then admitted from the pipes 2 through the auxiliary chambers 5 by turning the wheels 12 until the desired mixture is obtained. Having then secured the desired fluid mixture, the quantity of flow is controlled or entirely cut off by turning the wheel 13 of the stem 9. The supply of the mixture can thus be conveniently controlled without the inconvenience of adjusting the proportions of the mixture every time it is used and for variable loads. Referring to Figs. 3 and 4 the mixer is started by turning the wheel 13, the hand wheels 12 having been previously adjusted for the proper mixture. When the speed of the engine goes above normal, the governor balls swing outwardly and depress the stem 18 and the rack 19 attached thereto. The rack 19 engaging with the pinion 16 on the stem 9 rotates it in the proper direction for closing the combined passages, thus diminishing the fuel supply and thereby reducing the speed of the engine. The effect of this reduction of speed if carried below the normal is to cause the governor to act in the contrary manner, thereby opening wider the combined passage and admitting a larger supply of fuel.

Having now described one of the forms in which my invention may be embodied, what I claim and desire to secure by Letters Patent is:

1. In a mixing valve, the combination of a main chamber provided with a plurality of inlets and a single outlet forming openings therein, inlet chambers communicating therewith, means for controlling the admission of fluids from said chambers to the main chamber, and a single means in the main chamber adapted to open and close all the openings therein.

2. In a mixing valve, the combination of a main chamber provided with a plurality of inlets and a single outlet forming openings therein, inlet chambers communicating therewith, independent means for controlling the admission of fluids from said inlet chambers to the main chamber, and a single means in the main chamber adapted to open and close all the openings therein.

3. In a mixing valve, the combination of a main chamber provided with a plurality of inlets and a single outlet forming openings therein, inlet chambers communicating therewith, means for controlling the admission of fluids from said chambers to the main chamber, a single means in the main chamber adapted to open and close all the openings therein and automatic means for controlling said single means.

4. In a mixing valve, the combination of a main chamber provided with a plurality of inlets and a single outlet forming openings therein, inlet chambers communicating therewith, independent means for controlling the admission of fluids from said inlet chambers to the main chamber, a single means in the main chamber adapted to open and close all the openings therein and automatic means for controlling said single means.

5. In a mixing valve, the combination of a main chamber provided with a plurality of inlets and a single outlet forming openings therein; inlet chambers communicating therewith, means for controlling the admission of fluids from said chambers to the main chamber, a single means in the main chamber adapted to open and close a plurality of the openings therein and automatic means for controlling said single means.

6. In a mixing valve, the combination of a main chamber provided with a plurality of inlets and a single outlet forming openings therein; inlet chambers communicating therewith, independent means for controlling the admission of fluids from said inlet chambers to the main chamber, a single means in the main chamber adapted to open and close a plurality of the openings therein and automatic means for controlling said single means.

7. In a mixing valve the combination of a main chamber provided with a plurality of inlets and a single outlet forming openings therein, inlet chambers communicating therewith, means for controlling the admission of fluids from said chambers to the main chamber, and an integral means in the main chamber adapted to open and close a plurality of the openings therein, said integral means consisting of a member having a conical portion adapted to enter one of the openings in such manner that its convex surface closes also the other openings.

8. In a mixing valve the combination of a main chamber provided with a plurality of inlets and a single outlet forming openings therein, inlet chambers communicating therewith, independent means for controlling the admission of fluids from said chambers to the main chamber, and an integral means in the main chamber adapted to open
5 and close a plurality of the openings therein, said integral means consisting of a member having a conical portion adapted to enter one of the openings in such manner that its convex surface closes also the other openings.

CHRISTOPHER JOHN LAKE,
FORMERLY JOHN CHRISTOPHER LAKE.

Witnesses:
N. P. McKNEW,
O. BISHOP.